US012641378B2

(12) United States Patent
Sabin et al.

(10) Patent No.: US 12,641,378 B2
(45) Date of Patent: May 26, 2026

(54) WEARABLE HEARING ASSIST DEVICE WITH SOUND PRESSURE LEVEL SHIFTING

(71) Applicant: Bose Corporation, Framingham, MA (US)

(72) Inventors: Andrew Todd Sabin, Chicago, IL (US); Daniel M. Gauger, Jr., Berlin, MA (US); Andrew Jackson Stockton X, Dorchester, MA (US); Darrin Kiyoshi Reed, Framingham, MA (US)

(73) Assignee: Bose Corporation, Framingham, MA (US)

( * ) Notice: Subject to any disclaimer, the term of this patent is extended or adjusted under 35 U.S.C. 154(b) by 220 days.

(21) Appl. No.: 18/562,879

(22) PCT Filed: Apr. 29, 2022

(86) PCT No.: PCT/US2022/026895
§ 371 (c)(1),
(2) Date: Nov. 21, 2023

(87) PCT Pub. No.: WO2022/250854
PCT Pub. Date: Dec. 1, 2022

(65) Prior Publication Data

US 2024/0223970 A1 Jul. 4, 2024

Related U.S. Application Data

(60) Provisional application No. 63/193,202, filed on May 26, 2021.

(51) Int. Cl.
*H04R 25/00* (2006.01)

(52) U.S. Cl.
CPC ........... *H04R 25/43* (2013.01); *H04R 25/356* (2013.01); *H04R 25/50* (2013.01); *H04R 2225/49* (2013.01)

(58) Field of Classification Search
CPC ...... H04R 25/43; H04R 25/356; H04R 25/50; H04R 2225/49
See application file for complete search history.

(56) References Cited

U.S. PATENT DOCUMENTS

| | | | | |
|---|---|---|---|---|
| 2017/0251297 | A1* | 8/2017 | Darlington | G10K 11/17885 |
| 2017/0295439 | A1* | 10/2017 | Xu | H04R 25/407 |
| 2020/0007995 | A1 | 1/2020 | Pedersen et al. | |
| 2020/0382859 | A1* | 12/2020 | Woodruff | H03G 3/3005 |
| 2021/0104222 | A1 | 4/2021 | Laroche et al. | |
| 2022/0329952 | A1* | 10/2022 | Silberzahn | H04R 25/505 |

OTHER PUBLICATIONS

PCT International Search Report and Written Opinion for International Application No. PCT/US2022/026895, dated Aug. 1, 2022, 9 pages.

* cited by examiner

*Primary Examiner* — Sunita Joshi
(74) *Attorney, Agent, or Firm* — Hoffman Warnick LLC

(57) ABSTRACT

Various implementations include hearing assist devices and systems for processing audio signals. In particular implementations, a process includes receiving an input signal via a microphone; performing a sound pressure level (SPL) shift that decreases a gain of the input signal to generate a gain reduced audio signal; amplifying the gain reduced audio signal using dynamic range compression to generate an amplified audio signal; generating a noise reduced amplified signal using active noise reduction that simultaneously processes the input signal; and outputting the noise reduced amplified signal to an electrodynamic transducer.

20 Claims, 5 Drawing Sheets

WEARABLE HEARING ASSIST DEVICE WITH SOUND PRESSURE LEVEL SHIFTING

PRIORITY CLAIM

This application claims priority to U.S. Provisional Patent Application No. 63/193,202 filed on May 26, 2021, which is incorporated by reference in its entirety.

TECHNICAL FIELD

This disclosure generally relates to wearable hearing assist devices. More particularly, the disclosure relates to wearable hearing assist devices that utilize sound pressure level shifting to improve intelligibility and comfort in noisy environments.

BACKGROUND

Wearable hearing assist devices, which may come in various form factors, e.g., headphones, earbuds, audio glasses, etc., can significantly improve the hearing experience for a user. For instance, such devices typically employ one or more microphones and amplification components to amplify sounds such as the voice or voices of others speaking to the user. However, when using such devices in loud environments, speech intelligibility and comfort may suffer due to the fact that unwanted noise will be also be amplified. While such devices may employ technologies such as active noise reduction (ANR) for countering unwanted environmental noise, such technologies can be less effective in noisy environments such as restaurants, nightclubs, etc.

SUMMARY

All examples and features mentioned below can be combined in any technically possible way.

Systems and approaches are disclosed that improve speech intelligibility and/or comfort in a wearable hearing assist device. Some implementations include: receiving an input signal via a microphone; performing a sound pressure level (SPL) shift that decreases a gain of the input signal to generate a gain reduced audio signal; amplifying the gain reduced audio signal using dynamic range compression to generate an amplified audio signal; generating a noise reduced signal using active noise reduction that simultaneously processes the input signal; and combining the noise reduced signal with the amplified audio signal.

In additional particular implementations, a system is provided that includes a microphone; an electrodynamic transducer; a memory; and a processor configured to execute instructions from the memory to process audio signals for the hearing assistance device. The instructions cause the processor to: receive an input signal via a microphone; perform a sound pressure level (SPL) shift that decreases a gain of the input signal to generate a gain reduced audio signal; amplify the gain reduced audio signal using dynamic range compression to generate an amplified audio signal; generate a noise reduced signal using active noise reduction that simultaneously processes the input signal; and combine the noise reduced signal with the amplified audio signal and outputting a combined signal to the electrodynamic transducer.

Implementations may include one of the following features, or any combination thereof.

In some cases, an amount of the SPL shift is selectable via an SPL input control.

In other cases, a process include capturing an acoustic environmental assessment with a sensor and determining an amount of the SPL shift based on the acoustic environmental assessment. The sensor may include one or more of a microphone, a vibration detector, a wind detector, and a noise level detector.

In certain aspects the acoustic environmental assessment includes a detected loudness.

In certain implementations, the amount of SPL shift is based on a function that decreases the amount of SPL shift as the detected loudness increases. In some aspects, the function is determined using a machine learning model trained on a user behavior.

In other aspects, an amount of the SPL shift is calculated using one of a plurality of selectable functions that determine the amount of SPL shift based on an acoustic environmental assessment.

In some implementations, the dynamic range compression is implemented with wide dynamic range compression (WDRC) amplifier.

In various aspects, the amplified audio signal has an increased spectral tilt relative to the input signal appropriate for a hearing loss of a user.

In some aspects, the SPL shift is implemented according to a process that includes: using a feedforward ANR filter to process the input signal to produce a noise cancellation signal that is opposite in phase and smaller in magnitude than the input signal; and summing the noise cancellation signal with the input signal to generate the gain reduced audio signal.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

Figure 1:
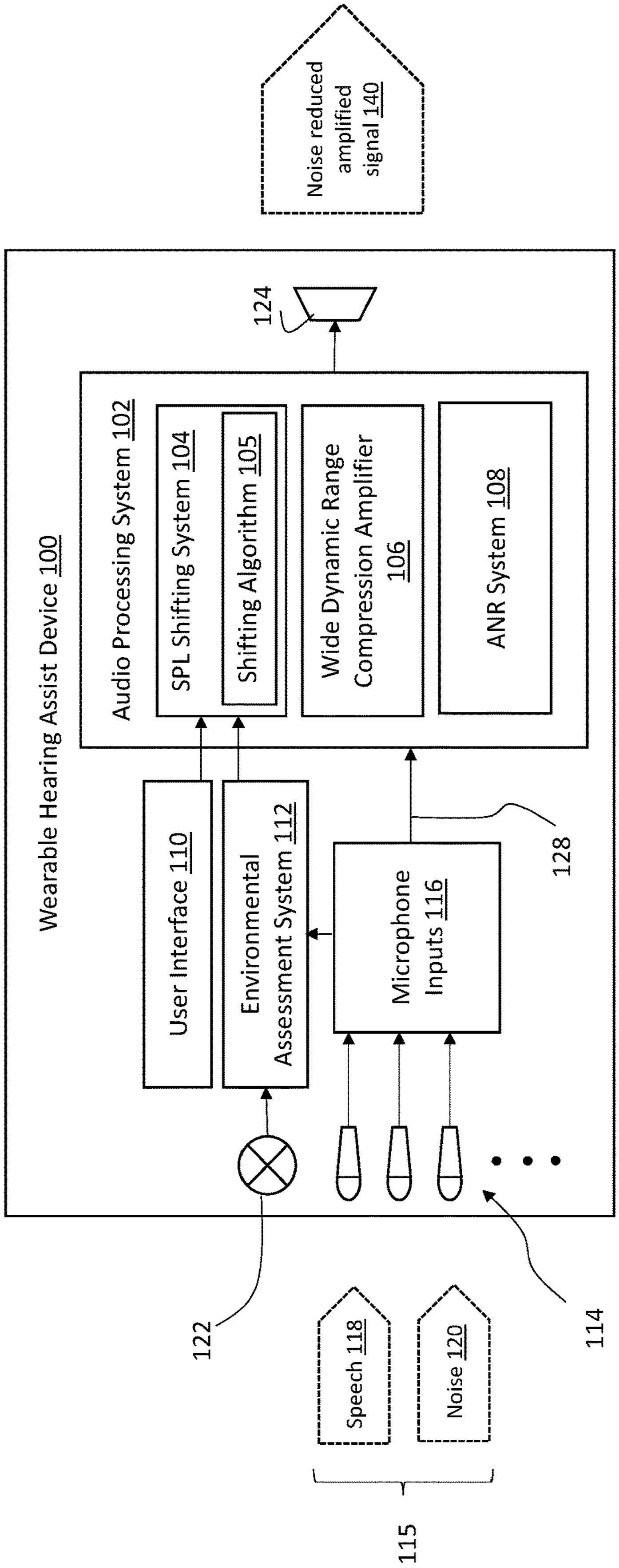
FIG. 1 depicts a block diagram of a wearable hearing assist device according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Various implementations describe solutions for improving speech intelligibility and comfort in a wearable hearing assist device. In general, when using a hearing assist device in a loud or noisy environment, amplification of environmental noise can reduce the effectiveness of the device. One technique for improving performance involves the use of dynamic range compression during amplification, which increases audibility for weak sounds while maintaining comfort for intense sounds, thereby increasing the dynamic range of sound available to the user. Another technique involves the use of active noise reduction (ANR), which cancels out noise using, e.g., feedback or feedforward filtering.

The present approach applies a broadband gain reduction, referred to herein as sound pressure level (SPL) shifting, prior to dynamic range compression amplification, to create a signal presented to the user on top of the quiet backdrop produced by ANR. Because the volume adjustment occurs before the hearing assist device signal processing, the signal processing is applied as though the input signal was received in a quieter environment. The result is that signal processing from the amplifier applies more gain and more spectral tilt than if no gain reduction was applied.

In a hearing assist device, such as a hearing aid, an audio augmented reality system, a system utilizing a remote microphone (e.g., from a phone or other device) that streams to a headphone, etc., sounds are transmitted to the ear via two different paths. The first path is the "direct path" where sound travels around the device or headphone and directly into the ear canal. In the second, "amplified path," the audio travels through the hearing assist device or headphone, is processed, and is then delivered to the ear canal through the driver (i.e., electrodynamic transducer or speaker).

Although generally described with reference to hearing assist devices, the solutions disclosed herein are intended to be applicable to a wide variety of wearable audio devices, i.e., devices that are structured to be at least partly worn by a user in the vicinity of at least one of the user's ears to provide amplified audio for at least that one ear. Other such implementations may include headphones, two-way communications headsets, earphones, earbuds, hearing aids, audio eyeglasses, wireless headsets (also known as "earsets") and ear protectors. Presentation of specific implementations are intended to facilitate understanding through the use of examples, and should not be taken as limiting either the scope of disclosure or the scope of claim coverage.

Additionally, the solutions disclosed herein are applicable to wearable audio devices that provide two-way audio communications, one-way audio communications (i.e., acoustic output of audio electronically provided by another device), or no communications, at all. Further, what is disclosed herein is applicable to wearable audio devices that are wirelessly connected to other devices, that are connected to other devices through electrically and/or optically conductive cabling, or that are not connected to any other device, at all. These teachings are applicable to wearable audio devices having physical configurations structured to be worn in the vicinity of either one or both ears of a user, including and not limited to, headphones with either one or two earpieces, over-the-head headphones, behind-the neck headphones, headsets with communications microphones (e.g., boom microphones), in-the-ear or behind-the-ear hearing aids, wireless headsets (i.e., earsets), audio eyeglasses, single earphones or pairs of earphones, as well as hats, helmets, clothing or any other physical configuration incorporating one or two earpieces to enable audio communications and/or ear protection.

In illustrative implementations, the processed audio may include any natural or manmade sounds (or, acoustic signals) and the microphones may include one or more microphones capable of capturing and converting the sounds into electronic signals.

In various implementations, the wearable audio devices (e.g., hearing assist devices) described herein may incorporate active noise reduction (ANR) functionality that may include either or both feedback-based ANR and feedforward-based ANR, in addition to possibly further providing pass-through audio and audio processed through typical hearing aid signal processing such as dynamic range compression.

Additionally, the solutions disclosed herein are intended to be applicable to a wide variety of accessory devices, i.e., devices that can communicate with a wearable audio device and assist in the processing of audio signals. Illustrative accessory devices include smartphones, Internet of Things (IoT) devices, computing devices, specialized electronics, vehicles, computerized agents, carrying cases, charging cases, smart watches, other wearable devices, etc.

In various implementations, the wearable audio device (e.g., hearing assist device) and accessory device communicate wirelessly, e.g., using Bluetooth, BLE, ZigBee, or other wireless protocols. In certain implementations, the wearable audio device and accessory device operate within several meters of each other.

FIG. 1 depicts an illustrative implementation of a wearable hearing assist device 100 that utilizes sound pressure level shifting (SPL) to enhance speech intelligibility and/or improve comfort. As shown, device 100 includes a set of microphones 114 configured to receive an input signal 115 that, e.g., includes speech 118 of a nearby person and noise 120 from a surrounding environment. Noise 120 generally includes all other acoustic inputs other than speech 118, e.g., background voices, environmental sounds, music, etc. Microphone inputs 116 receive inputted signals from the microphones 114 and pass the captured audio signals 128 to audio processing system 102.

Audio processing system 102 includes an SPL shifting system 104, a wide dynamic range compression amplifier 106 and an active noise reduction (ANR) system 108. Audio processing system 102 processes the captured audio signals 128 and outputs a processed audio signal, i.e., a noised reduced amplified signal 140, via an electrodynamic transducer 124. In some embodiments, device 100 also includes a user interface 110 and/or environmental assessment system 112 to control the amount of gain reduction implemented by SPL shifting system 104. Environmental assessment system 112 can for example receive an input from one of the microphones 114 and/or a sensor 122. In certain aspects, sensor 122 can comprise a separate microphone, a vibration detector, a wind detector, a noise level detector, etc. User interface 110 may include any type of control device that allows the user to manipulate the amount or type of SPL shifting, e.g., a volume knob, a wireless interface for connecting to a smart device or separate accessory, etc.

SPL shifting system 104 may also include a shifting algorithm 105 that determines an amount of shift or a shifting scheme based on inputs, e.g., from user interface 110 and/or environmental assessment system 112. In some approaches, shifting algorithm 105 may utilize a machine learning model that is trained on user behaviors and preferences to automatically adjust the shifting or apply a shifting scheme for a particular scenario. For example, the machine learning model may be trained based on how the user or other users (e.g., a group of users) tend to adjust the volume control in different environments. In some aspects, the environmental assessment comprises a detected loudness, and the amount of SPL shift is based on a function that decreases the amount of SPL shift as the detected loudness increases. In other implementations, the SPL shift is calculated using one of a plurality of user-selectable functions that determine the amount of SPL shift. One or more of the functions may be based on the environmental assessment 112.

Any mechanism for reducing gain to achieve an SPL shift may be deployed. In one approach, the mechanism may include a volume control such as a potentiometer that provides a voltage divider or variable resistor. In a further approach, the SPL shift may be achieved by having a wearable provide its maximum ANR, in which case the direct path 132 represents what the user wants to hear (i.e., speech 118, as best captured by a microphone array, remote microphone, etc.). SPL shifting is applied to the captured speech via any electrical or digital signal attenuating means, to achieve the desired presentation level determined by the shifting algorithm, prior to applying WDRC 106.

In a further approach, the ANR system 108 could create the intended SPL shift at the ear in the direct path 132, e.g., using methods as described in U.S. Pat. No. 9,949,017, "Controlling Ambient Sound Volume" issued to Rule et al., and U.S. Pat. No. 10,096,313, "Parallel Active Noise Reduction (ANR) and Hear-Through Signal Flow Paths in Acoustic Devices" issued to terMeulen et al., the contents of both are hereby incorporated by reference. In this case, WDRC is applied to the speech signal that's been separated.

Figure 2:
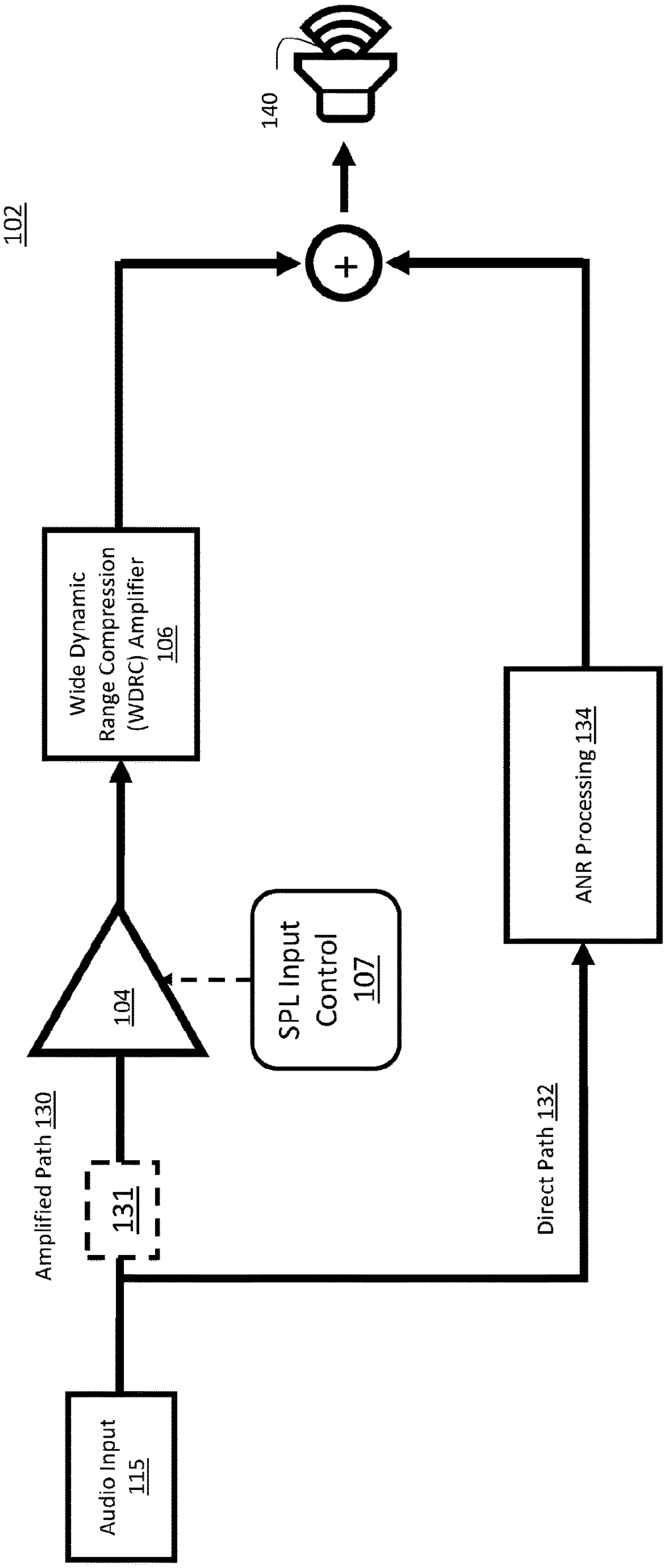
FIG. 2 depicts a flow diagram of an audio processing system according to various implementations.

FIG. 2 depicts an illustrative overview of the audio processing system 102 (FIG. 1) that includes an amplified path 130 for amplifying the audio input using a wide dynamic range compression (WDRC) amplifier 106 and a direct path 132 that includes sounds received within the ear canal of the user to simultaneously effectuate ANR processing 134. ANR processing 134 may for example utilize a feedback or feedforward microphone to generate noise cancelling signals that are combined with the output of the amplifier 106 to generate a noised reduced amplified signal 140. As noted, WDRC amplification is a signal processing technique that increases audibility for weak sounds while maintaining comfort for intense sounds, thereby increasing the dynamic range of sound available to the user.

Optionally, processing system 102 may include a system 131 that receives several of the microphone inputs 116 (FIG. 1) and apples array and or machine learning techniques, or a combination, to separate to a degree speech 118 that the user wishes to hear from noise 120 that the user may not want to hear.

The present solution further enhances dynamic range compression by utilizing SPL shifting system 104 to implement a gain reduction prior to amplification by WDRC amplifier 106. Because the gain reduction occurs before the WDRC amplifier 106, the WDRC signal processing is applied as though the device 100 is operating in a quieter environment. More particularly, by reducing gain prior to processing by WDRC amplifier 106, the WDRC amplifier 106 applies more gain and more spectral tilt relative to the case where no gain reduction was applied. By applying a volume reduction first, the gain applied by the WDRC amplifier will be as-prescribed but for the user-reduced input level. Any effects of the SPL shifting will generally be greatly enhanced by active noise reduction because even a modest downward "shift" can depend on cancelation of low frequencies (where hearing aid gain is already small and cancelation is most effective). Without the ANR and without much direct path gain, the amplified path which the user desires to hear would be lost in the noise passing through the direct path.

SPL input control 107 may be implemented as described herein to adjust the SPL shift using a manual input (e.g., control knob), automated process (e.g., a shifting algorithm 105, FIG. 1), or a combination of both. For example, the user could select a comfort setting (e.g., high, medium or low), and the SPL input control 107 will calculate an amount of shift based on an environmental assessment. Illustrative SPL mapping schemes are described below with reference to FIG. 4.

Figure 3:
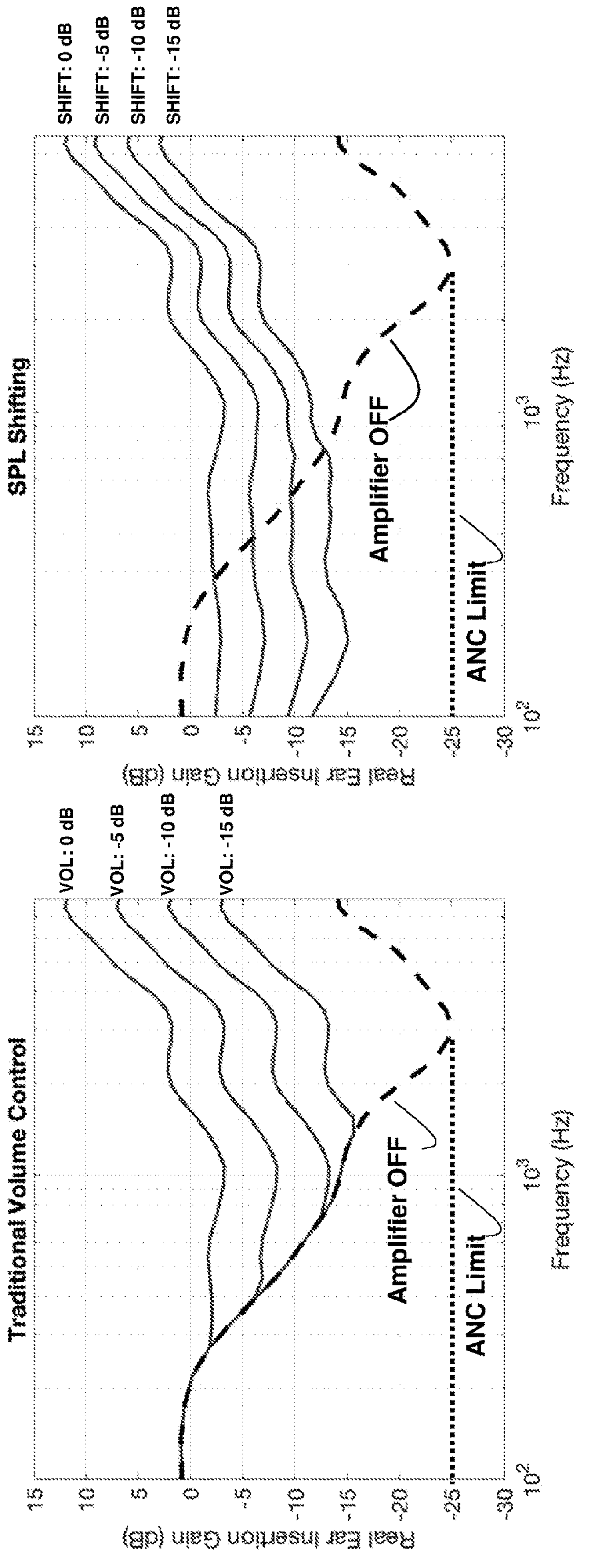
FIG. 3 depicts Real Ear Insertion Gain (REIG) curves according to various implementations.

FIG. 3 depicts a pair of graphs showing illustrative Real Ear Insertion Gain (REIG) curves. The left hand graph shows a set of REIG curves for a traditional volume control (broadband output attenuation). The right hand graph shows a set of REIG curves that result from SPL shifting. The dashed line in both cases shows the REIG when the amplifier 106 is powered off and the solid lines represent different gain levels when turned on. Both examples represent the case where a hearing aid is fit to prescribed targets for a moderate sensorineural hearing loss and the input is a loud restaurant.

In the case of the traditional volume control, the dashed line represents the lower limit of degree of attenuation. Notice that there two departures from clinical best practices. First, at low volumes (e.g., Vol −15 dB) the REIG has a U shape, where the prescription (Vol 0 dB) has a rising shape, increasing with frequency. Second, for sensorineural prescriptions, the slope of the rising part of the gain should become steeper in quieter environments to account for loudness recruitment. With a traditional volume control, the slope of this rising portion does not change.

In the case where SPL shifting is applied, the dashed line likewise indicates the REIG when amplifier 106 is powered off, but the lower limit of attenuation is determined by the active noise reduction system. Notice that unlike the traditional volume control, (a) the REIG is rising with increasing frequency regardless of the shift amount and (b) the slope of that rising function become steeper as the shift becomes more negative. This slope follows the prescribed targets for an SPL that lower than environmental SPL by the selected shift.

Figure 4:
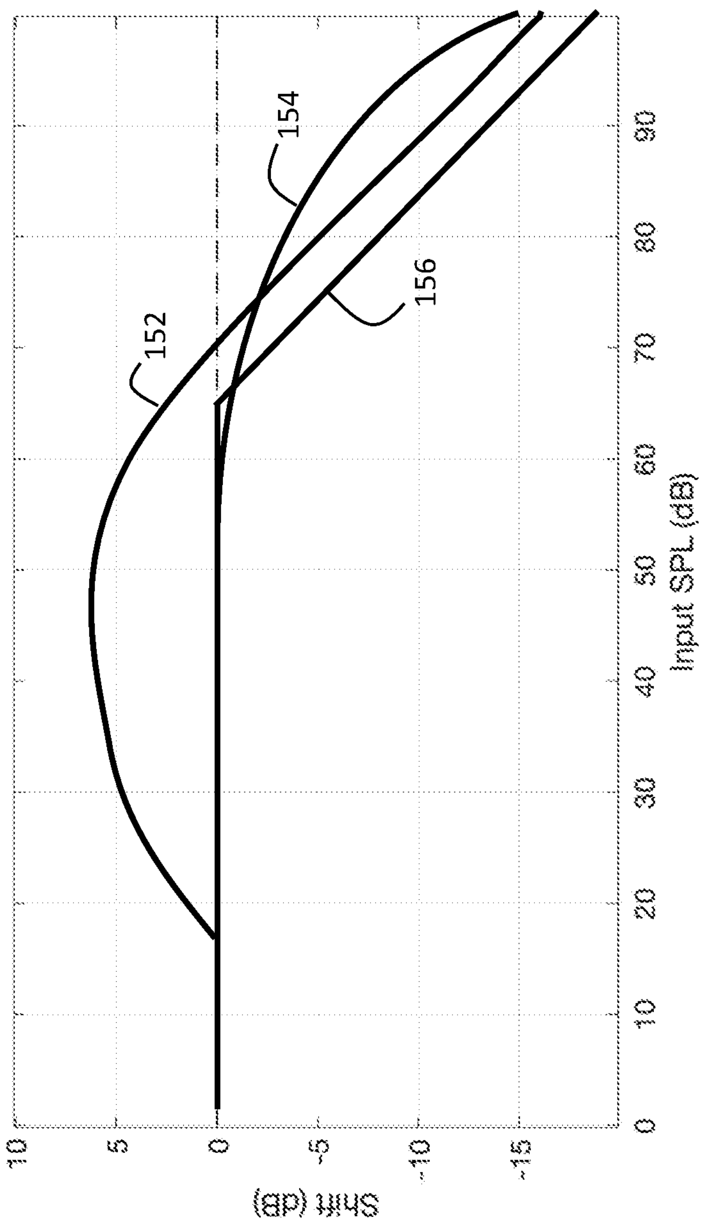
FIG. 4 depicts different SPL mapping schemes according to various implementations.

FIG. 4 depicts a graph of different illustrative SPL mapping schemes 152, 154, 156. The feature displayed is the SPL of the user's environment. Different users may prefer different mappings. Mappings can result in different balances of auditory comfort in noise and ease (i.e., mental effort) of understanding the target speech. As noted, in certain aspects, mappings can be created via machine learning applied to user behavior. In other aspects, the mapping schemes may include selectable functions that depend on an environmental assessment.

It is understood that the device 100 (FIG. 1) shown and described according to various implementations may be structured to be worn by a user to provide an audio output to a vicinity of at least one of the user's ears. The device 100 may have any of a number of form factors, including configurations that incorporate a single earpiece to provide audio to only one of the user's ears, others that incorporate a pair of earpieces to provide audio to both of the user's ears, and others that incorporate one or more standalone speakers to provide audio to the environment around the user. Example wearable audio devices are illustrated and described in further detail in U.S. Pat. No. 10,194,259 (Directional Audio Selection, filed on Feb. 28, 2018), which are hereby incorporated by reference in its entirety.

In the illustrative implementations, the audio input 115 may include any ambient acoustic signals, including acoustic signals generated by the user of the wearable hearing assist device 100, as well as natural or other manmade sounds. The microphones 114 may include one or more microphones (e.g., one or more microphone arrays including a feedforward and/or feedback microphone) capable of capturing and converting the sounds into electronic signals.

Figure 5:
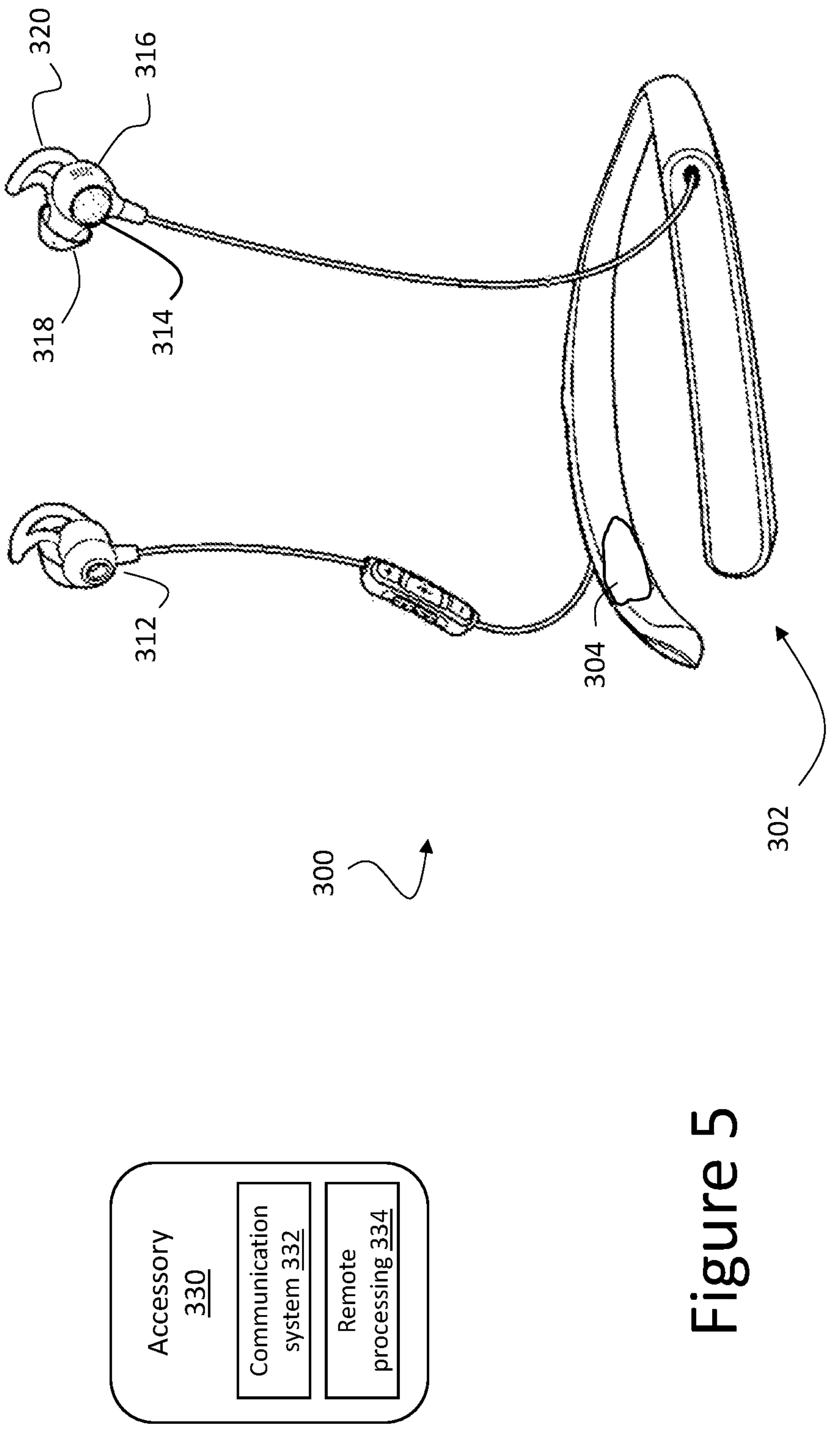
FIG. 5 depicts an example of a wearable hearing assist device according to various implementations.

FIG. 5 is a schematic depiction of an illustrative wearable hearing assist device 300 (in one example form factor) that includes electronics 304, such as a processor module (e.g., incorporating audio processing system 102, FIG. 1) contained in housing 302. It is understood that the example wearable hearing assist device 300 can include some or all of the components and functionality described with respect to device 100 depicted and described with reference to FIG. 1. In some embodiments, certain features such as a user interface 110 may be implemented in an accessory 330 that is configured to communicate with the wearable hearing assist device 300. In this example, the wearable hearing assist device 300 includes an audio headset that includes two earphones (for example, in-ear headphones, also called "earbuds") 312, 314. While the earphones 312, 314 are tethered to housing 302 (e.g., neckband) that is configured to rest on a user's neck, other configurations, including wireless configurations can also be utilized. Even further, electronics 304 in the housing 302 can also be incorporated into one or both earphones, which may be physically coupled or wirelessly coupled. Each earphone 312, 314 is shown including a body 316, which can include a casing formed of one or more plastics or composite materials. The body 316 can include a nozzle 318 for insertion into a user's ear canal entrance and a support member 320 for retaining the nozzle 318 in a resting position within the user's ear. In addition to the processor component, the housing 302 can include other electronics 304, e.g., batteries, user controls, motion detectors such as an accelerometer/gyroscope/magnetometer, a voice activity detection (VAD) device, etc.

In certain implementations, as noted above, a separate accessory 330 can include a communication system 332 to, e.g., wirelessly communicate with device 300 and includes remote processing 334 to provide some of the functionality described herein, e.g., training of a machine learning model, etc. Accessory 330 can be implemented in many embodiments. In one embodiment, the accessory 330 comprises a stand-alone device. In another embodiment, the accessory 330 comprises a user-supplied smartphone utilizing a software application to enable remote processing 334 while using the smartphone hardware for communication system 332. In another embodiment, the accessory 330 could be implemented within a charging case for the device 300. In another embodiment, the accessory 330 could be implemented within a companion microphone accessory, which also performs other functions such as off-head beamforming and wireless streaming of the beamformed audio to device 300. As noted herein, other wearable device forms could likewise be implemented, including around-the-ear headphones, over-the-ear headphones, audio eyeglasses, open-ear audio devices etc.

With reference to FIG. 1 the set of microphones 114 may include an in-ear microphone that could be integrated into the earbud body 316, for example in nozzle 318. The in-ear microphone can also be used for performing feedback active noise reduction (ANR) and voice pickup for communication, which may be performed within other electronics 304.

According to various implementations, a hearing assist device is provided that will reduce the gain along an amplified path prior to processing by a dynamic range compression amplifier. As described herein, the hearing assist device according to various implementations can have the technical effect of using sound pressure level shifting to improve intelligibility and comfort in noisy environments.

It is understood that one or more of the functions of the described systems may be implemented as hardware and/or software, and the various components may include communications pathways that connect components by any conventional means (e.g., hard-wired and/or wireless connection). For example, one or more non-volatile devices (e.g., centralized or distributed devices such as flash memory device(s)) can store and/or execute programs, algorithms and/or parameters for one or more described devices. Additionally, the functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions. All or part of the functions can be implemented as, special purpose logic circuitry, e.g., an FPGA (field programmable gate array) and/or an ASIC (application-specific integrated circuit). Processors suitable for the execution of a computer program include, by way of example, both general and special purpose microprocessors, and any one or more processors of any kind of digital computer. Generally, a processor may receive instructions and data from a read-only memory or a random access memory or both. Components of a computer include a processor for executing instructions and one or more memory devices for storing instructions and data.

It is noted that while the implementations described herein utilize microphone systems to collect input signals, it is understood that any type of sensor can be utilized separately or in addition to a microphone system to collect input signals, e.g., accelerometers, thermometers, optical sensors, cameras, etc.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

What is claimed is:

1. A method for processing signals in a hearing assistance device, the method comprising:
receiving an input signal via a microphone;
performing a sound pressure level (SPL) shift that decreases a gain of the input signal to generate a gain reduced audio signal;
amplifying the gain reduced audio signal using dynamic range compression to generate an amplified audio signal;
generating a noise reduced signal using active noise reduction that simultaneously processes the input signal; and
combining the noise reduced signal with the amplified audio signal.

2. The method of claim 1, wherein an amount of the SPL shift is one of: (1) selectable via an input control or (2) calculated using one of a plurality of selectable functions that determines the amount of SPL shift based on an environmental assessment.

3. The method of claim 1, further comprising:
receiving an environmental assessment with a sensor; and
determining an amount of the SPL shift based on the environmental assessment.

4. The method of claim 3, wherein the sensor comprises at least one of a separate microphone, a vibration detector, a wind detector, and a noise level detector, wherein the environmental assessment comprises a detected loudness, and wherein the amount of SPL shift is based on a function that varies the amount of SPL shift as the detected loudness increases.

5. The method of claim 4, wherein the function is determined using a machine learning model trained on a user behavior.

6. The method of claim 1, wherein the dynamic range compression is implemented with a wide dynamic range compression (WDRC) amplifier.

7. The method of claim 1, wherein the amplified audio signal has an increased spectral tilt relative to the input signal appropriate for a hearing loss of a user.

8. A hearing assistance device, comprising: a microphone;
an electrodynamic
transducer; a
memory; and
a processor configured to execute instructions from the memory to process audio signals for the hearing assistance device, wherein the instructions cause the processor to:
receive an input signal via a microphone;
perform a sound pressure level (SPL) shift that decreases a gain of the input signal to generate a gain reduced audio signal;
amplify the gain reduced audio signal using dynamic range compression to generate an amplified audio signal;
generate a noise reduced signal using active noise reduction that simultaneously processes the input signal; and
combine the noise reduced signal with the amplified audio signal and outputting a combined signal to the electrodynamic transducer.

9. The device of claim 8, further comprising an input control configured to select an amount of SPL shift.

10. The device of claim 8, further comprising a sensor that receives an environmental assessment, wherein the environmental assessment determines an amount of the SPL shift.

11. The device of claim 10, wherein the sensor comprises at least one of a separate microphone, a vibration detector, a wind detector, and a noise level detector, wherein the environmental assessment comprises a detected loudness, and wherein the amount of SPL shift is based on one of: i) a function that varies the amount of SPL shift as the detected loudness increases, or ii) one of a plurality of selectable functions that depend on an environmental assessment.

12. The device of claim 11, wherein the function is determined using a machine learning model trained on a user behavior.

13. The device of claim 8, wherein the dynamic range compression is implemented with a wide dynamic range compression (WDRC) amplifier.

14. The device of claim 8, wherein the SPL shift is implemented according to a process that comprises:
using a feedforward ANR filter to process the input signal to produce a noise cancellation signal that is opposite in phase and smaller in magnitude than the input signal; and
summing the noise cancellation signal with the input signal to generate the gain reduced audio signal.

15. A method for processing signals in a hearing assistance device, the method comprising:
receiving an input signal via a microphone;
performing a sound pressure level (SPL) shift with a broadband gain reduction that decreases a gain of the input signal to generate a gain reduced audio signal;
amplifying the gain reduced audio signal using dynamic range compression to generate an amplified audio signal;
generating a noise reduced signal using active noise reduction that simultaneously processes the input signal; and
combining the noise reduced signal with the amplified audio signal.

16. The method of claim 15, wherein the gain reduced audio signal is directly amplified using dynamic range compression, wherein the dynamic range compression is implemented with a wide dynamic range compression (WDRC) amplifier.

17. The method of claim 1, wherein the SPL shift includes a broadband gain reduction.

18. The method of claim 6, wherein the gain reduced audio signal is fed directly to the WDRC amplifier.

19. The device of claim 8, wherein the SPL shift includes a broadband gain reduction.

20. The device of claim 13, wherein the gain reduced audio signal is fed directly to the WDRC amplifier.

* * * * *